June 14, 1932. G. FOX 1,862,619
STOCK INDICATOR
Filed March 26, 1926
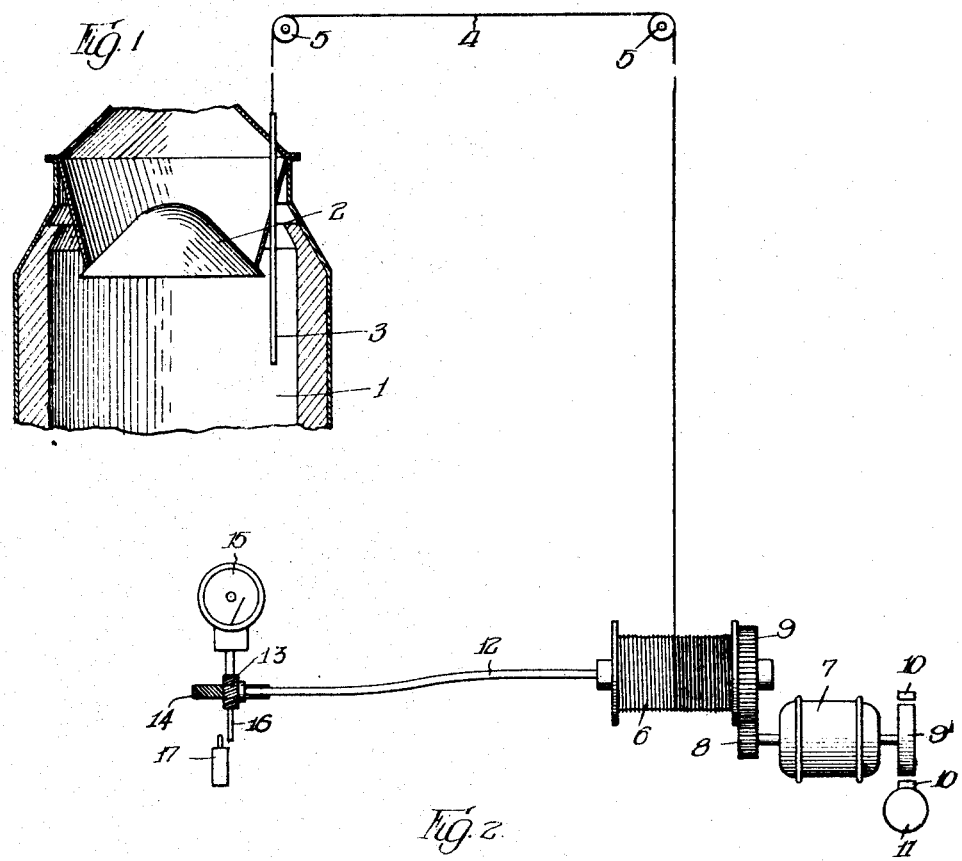
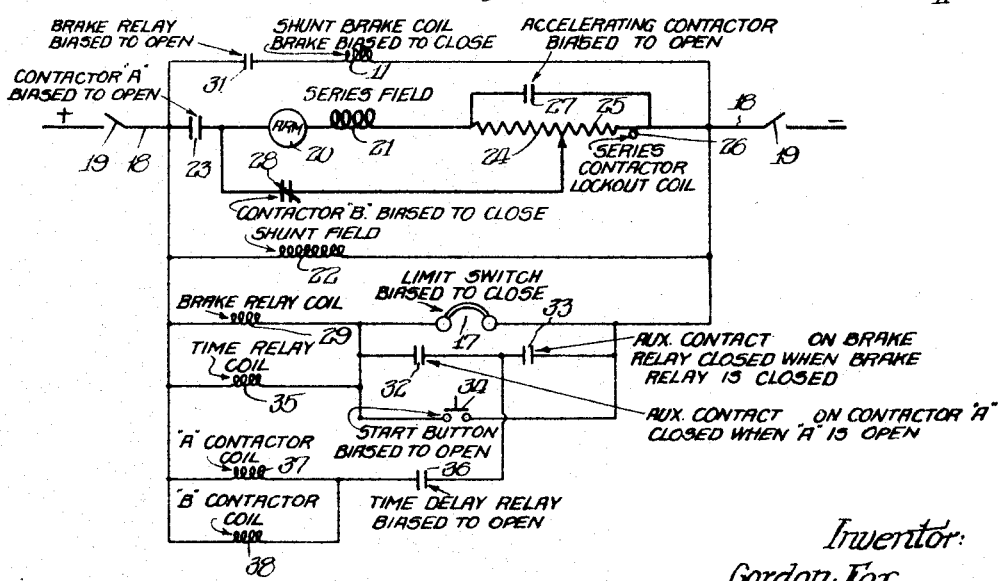
Witness:
R. Burkhardt
Inventor:
Gordon Fox,
By Wilkinson, Huxley, Byron & Knight
attys.

Patented June 14, 1932

1,862,619

UNITED STATES PATENT OFFICE

GORDON FOX, OF CHICAGO, ILLINOIS, ASSIGNOR TO FREYN ENGINEERING COMPANY, OF CHICAGO, ILLINOIS, A CORPORATION OF MAINE

STOCK INDICATOR

Application filed March 26, 1926. Serial No. 97,810.

The present invention relates to improvements in stock indicators.

The present invention is useful in connection with the loading of blast furnaces and will be described with particular reference to such structures, though as the description proceeds it will be apparent that the invention has a much broader field of application.

The present invention contemplates a device which is preferably of the recording type for indicating the level of material such as the charge within a blast furnace. According to the present invention, a try rod or similar device is provided which may be lowered until it rests upon the material within a blast furnace or other receptacle, the position of said try rod, which may be indicated at any convenient distant point if desired, showing the level of the charge within said receptacle at the time of that particular test.

The present invention contemplates means for conveniently manipulating said try rod or similar device, and an object of the present invention is to provide a level indicator such, for example, as an indicator for the level of stock within the blast furnace, which will efficiently meet the needs of commercial operation.

A further object is to provide a level indicator involving an electric hoist which upon a simple starting operation will automatically perform a complete cycle to indicate the level of the material being measured at that particular test.

A further object is to provide a level indicator with electric control means such that said indicator may be controlled at a convenient distant point and may give its indication at a convenient point, which may be at a distance from the region of the material whose level is being measured.

Further objects will appear as the description proceeds.

Referring to the drawing—

Figure 1 is a diagrammatic view illustrating one embodiment of the present invention; and Figure 2 is a schematic view illustrating the electrical connections of the apparatus shown in Figure 1.

A detailed explanation of the present invention may be prefaced by a short statement of the functions of the apparatus above briefly described.

The invention as indicated above involves a test or try rod, which may have a movement of reciprocation in a vertical direction within a blast furnace or other receptacle. Said test or try rod may be controlled by means of a flexible connector, which in turn is controlled by a winding drum. Said winding drum is driven through suitable gear reductions by a shunt or compound electric motor. The shaft of said motor may carry a brake wheel, which may be controlled by a brake biased to braking position and having electrical means for releasing said brake. A recording meter may be driven from the shaft of said winding drum, said meter being operated by any of the well known means to produce the result that the amount of deflection of the stylus is proportioned to the amount of rotation of said winding drum. Means are also provided for opening a limit switch at a given angular position of the winding drum. An illustrative cycle of operation may be stated as follows. Operation of a start button or similar means releases the brake above referred to and permits the test or try rod to lower. The descending motion is retarded by the motor, which is provided with suitable dynamic braking connections. The test or try rod descends until it rests upon the stock or burden. After the lapse of a certain length of time, which may be chosen as desired, the motor is automatically caused to reverse and wind up the flexible connector, thereby hoisting the test or try rod. When the winding drum has attained a zero position corresponding to the topmost position of the try rod, a limit switch is opened, the brake is applied to prevent the accidental lowering of said test or try rod, and the motor is disconnected from circuit. The test or try rod is then held suspended by the brake, until the inauguration of the next cycle. Obviously, the cycle may be inaugurated by the pushing of a push button, or may be inaugurated in response to a movement of any suitable part of the mechanism, such as the charging bell. The particular means for inaugurating the cycle form no part of the present invention.

According to the illustrated embodiment of the present invention, a blast furnace 1 is indicated, having the charging bell 2. Mounted within the blast furnace is the test or try rod 3, which test or try rod is controlled by means of the flexible connector 4 disposed upon the sheaves 5—5. Said flexible connector 4 is connected to the winding drum 6, which may be grooved if preferred. An electric motor 7 is provided for turning the drum 6, a pinion 8 being indicated upon the motor shaft adapted to engage with the gear 9 coaxially mounted with the winding drum 6. The shaft of the electric motor 7 is provided with the brake wheel 9', which brake wheel is controlled by the brake shoes 10—10, which shoes are normally biased to braking position. A brake coil 11 is provided which when energized is adapted to hold the brake shoes 10—10 out of braking relationship with the brake wheel 9'. Driven from the winding drum 6 is the flexible shaft 12 adapted to drive the worm 13. Said worm 13 engages with the worm wheel 14, which worm wheel is adapted to drive the recording meter 15. The worm wheel 14 is adapted, through connections not shown, to control the lever 16 for operating the normally closed limit switch 17.

Figure 2 shows schematically the electrical connections of the mechanism shown in Figure 1. The numerals 18—18 indicate the two sides of an electric circuit, which circuit may be controlled by the blades 19—19 of a double pole switch. The electric motor 7 comprises the armature 20, the series field winding 21, and the shunt field winding 22. The armature and series field winding are connected across the lines 18—18 through the following circuit: through the contactor 23, which is biased to open position, which contactor is indicated on the drawing as contactor A, and through the sections 24 and 25 of an accelerating resistance, and through the series contactor lockout coil 26. The sections of resistance 24 and 25 and the lockout coil 26 are bridged by the accelerating contactor 27, which is biased to open position. Bridged across the armature 20, series field winding 21 and section 24 of the accelerating resistance is a circuit including a switch or contactor 28, which is indicated on the drawing as contactor B and which is biased to closed position. As noted in Figure 2 of the drawing, the shunt field winding 22 is connected across the leads 18—18. Also connected across said leads 18—18 is a circuit including the brake relay coil 29 and the limit switch 17, which is biased to closed position. Also bridged across the leads 18—18 is a circuit including the brake relay 31 and the shunt brake coil 11. Said brake relay is biased to open position, but is closed upon energization of the brake relay coil 29.

Bridged across the normally closed limit switch 17 is a circuit containing the auxiliary contact 32 and the auxiliary contact 33, which auxiliary contacts 32 and 33 are connected together in series. The auxiliary contact 32 moves in unison with the contactor 23 and is in closed position when contactor 23 is open. The auxiliary contact 33 moves in unison with the brake relay 31 and is closed when said brake relay 31 is closed. Bridged across the auxiliary contact 32 is the start button 34, which is biased to open position. Bridged across the brake relay coil 29 is the time delay relay coil 35, which controls the time delay relay 36, which is biased to open position. Bridged across the time delay relay coil 35 and auxiliary contact 32 is a circuit including the time delay relay 36 and the operating coil 37 for contact 23. Connected in parallel with the operating coil 37 of the contactor 23 is the operating coil 38 for the normally closed contactor 28.

When it is desired to inaugurate the cycle of movement of the test rod 3, the operator may depress the start button 34 momentarily. At this time the test rod 3 is in its uppermost position and the limit switch 17 is thereby held in open position. This action closes a circuit from the positive lead 18 through the brake relay coil 29 and the time delay relay coil in parallel with said coil 29 to the negative lead 18. Energization of said brake relay coil 29 results in the closing of the brake relay 31 and the closing of the auxiliary contact 33 which moves in unison with said brake relay 31. Energization of the time delay relay coil 35 causes the closing of the time delay relay 36 only after the selected time delay interval. A holding circuit is now completed from the positive lead 18 through the brake relay coil 29 and the time delay relay coil 35 in parallel with said coil 29, the auxiliary contact 32, which auxiliary contact 32 is closed at this time, through the auxiliary contact 33, to the negative lead 18.

Closure of the brake relay 31 causes the shunt brake on the shaft of the motor 7 to be released. The contactor 23 is open at this time, and the contactor 28 is closed. The weight of the test rod 3 acts on the motor and causes the armature 20 thereof to revolve. The limit switch 17, being biased to closed position, will close directly after the test rod starts to descend. Current is immediately circulated through the local circuit comprising said armature 20, series field winding 21, section 24 of the accelerating resistance and contactor 28; i. e., the motor thus temporarily acts as a generator and has a consequent retarding effect on the descent of the rod 3. The motor 7 continues to revolve until the try rod 3 has descended to a point where it rests upon the material whose level is to be measured.

The time delay relay 36 was, as referred to above, energized at the same time that the brake relay 31 was energized. The time delay relay 36 is so set as to permit a sufficient lapse of time to allow the try rod 3 to descend to the lowest possible position within its range of movement and to remain at rest for a few seconds. At the end of this time, the time delay relay contacts 36 close. Closure of said time delay relay contacts 36 results in the closure of contactor 23 and the opening of contactor 28. The voltage across the leads 18—18 is now impressed upon the motor 7 through the accelerating resistances 24 and 25, and said motor proceeds to hoist the test rod 3. The sections 24 and 25 of the accelerating resistance is short-circuited by the contactor 27, which is responsive to the series contactor lockout coil 26, which operates in a manner which is well understood by those skilled in the art. When the test rod 3 has reached the uppermost limit of travel, the limit switch 17 is opened automatically by reason of the engagement of the lever 16 with said limit switch 17. This causes the deenergization of the brake relay coil 29, which permits the brake relay 31 to open, deenergizing the shunt brake coil 11, allowing the brake shoes 10—10 to move into braking engagement with the brake coil 9'. Deenergization of the brake relay coil 29 also causes the movement of the auxiliary contact 33 to open position, which causes the open-circuiting of the operating coil 37 of contactor 23 and the operating coil 38 of the contactor 28. Deenergization of said coils 37 and 38 allows contactor 23 to move to open position and contactor 28 to move to closed position, thereby completing the cycle.

Inasmuch as the movement of the shaft of the motor 7 and the movement of the winding drum 6 is communicated to the meter 15, it will be apparent that the level of the material within the receptacle 1 will be indicated on said meter 15 for each test. Inasmuch as the meter 15 may be a recording meter, the present invention provides the advantage that a record of the levels within the receptacle 1 may be readily maintained.

Though a preferred embodiment of the present invention has been described in detail, many modifications will occur to those skilled in the art. It is intended to cover all such modifications that fall within the scope of the appended claims.

What is claimed is—

1. A level indicator comprising a gravity responsive test member, an electric motor for raising said test member, said motor being provided with a dynamic braking circuit, mechanical brake means for said motor biased to braking relationship with said motor, and electric control means for said mechanical brake means and said motor, said electric control means being adapted to release said brake and to operatively connect said dynamic braking circuit with said motor, said electric control means being provided with time control means for rendering said motor operative to perform motoring functions.

2. A level indicator including a gravity responsive test member, an electric motor for raising said test member, said motor being provided with electrical brake means responsive to the generator action of the armature thereof, mechanical brake means for said motor, and electrical control means for releasing said mechanical brake means from said motor, said control means being adapted to render operative said electrical brake means whereby said test member, when said mechanical brake means is released, may descend at a safe speed and operate said motor as a generator for braking purposes, said electrical control means including a time responsive member for energizing said motor to lift said test member.

3. A level indicator including a gravity responsive test member, an electric motor for lifting said test member, a dynamic braking circuit for said motor, means for holding said test member in elevated position, a limit switch for controlling the extent to which said motor may lift said test member, and electrical control means for releasing said holding means to allow said test member to drive said motor as a generator for dynamic braking purposes, said electrical control means including a time delay relay to energize said electric motor for lifting said test member.

4. A level indicator comprising a gravity responsive test member, an electric motor for lifting said test member, electrical control means for said motor for limiting the extent to which said motor may raise said test member, said electrical control means including a switch biased to open position and means responsive to said switch for causing said test member to operate said motor as a generator for braking purposes, said means including a time responsive device for connecting said motor to raise said test member and an indicator responsive to the movement of said motor for indicating the range of movement of said test member.

5. A level indicator including a gravity responsive test member, a dynamo electric machine, hoisting mechanism for said test member, said hoisting mechanism being connected to said dynamo electric machine, a brake for said dynamo electric machine for holding said test member in raised position, a starting switch biased to open position, electrical control means responsive to the momentary closure of said starting switch for releasing said brake, for causing the energization of said dynamo electric machine as a motor after the lapse of a predetermined interval of time, and for setting said brake upon said dynamo electric machine to hold said test member in raised position.

6. A level indicator including a gravity responsive test member, a dynamo electric machine, hoisting mechanism for said test member, said hoisting mechanism being connected to said dynamo electric machine, a brake for said dynamo electric machine for holding said test member in raised position, a starting switch biased to open position, electrical control means responsive to the momentary closure of said starting switch for releasing said brake, for causing the energization of said dynamo electric machine as a motor after the lapse of a predetermined interval of time, and for setting said brake upon said dynamo electric machine to hold said test member in raised position, and an indicator spaced from said test member for indicating the position of said test member.

Signed at Chicago, Illinois, this 18th day of March, 1926.

GORDON FOX.